US012068614B2

(12) United States Patent
Keppler et al.

(10) Patent No.: US 12,068,614 B2
(45) Date of Patent: Aug. 20, 2024

(54) IMPEDANCE MATCHING FOR WIRELESS POWER TRANSFER

(71) Applicant: Avago Technologies International Sales Pte. Limited, Singapore (SG)

(72) Inventors: Marc Keppler, Windsor, CO (US); John Walley, Ladera Ranch, CA (US); Jim Le, Timanth, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/470,129

(22) Filed: Sep. 19, 2023

(65) Prior Publication Data
US 2024/0063659 A1    Feb. 22, 2024

Related U.S. Application Data

(63) Continuation of application No. 17/890,949, filed on Aug. 18, 2022, now Pat. No. 11,799,321.

(51) Int. Cl.
*H02J 50/10* (2016.01)
*H02J 7/00* (2006.01)

(52) U.S. Cl.
CPC ........... *H02J 50/10* (2016.02); *H02J 7/00711* (2020.01); *H02J 7/00712* (2020.01)

(58) Field of Classification Search
CPC ..... H02J 50/10; H02J 7/00711; H02J 7/00712
USPC ........................................................ 307/104
See application file for complete search history.

(56) References Cited

U.S. PATENT DOCUMENTS

| 9,608,454 | B2 | 3/2017 | Sankar |
| 9,899,908 | B1* | 2/2018 | Zhao ....................... H02J 50/12 |
| 10,122,203 | B2 | 11/2018 | Sankar |
| 10,245,962 | B2 | 4/2019 | Lee et al. |
| 10,340,786 | B2 | 7/2019 | Zhao et al. |
| 10,348,099 | B2 | 7/2019 | Taylor et al. |
| 10,454,317 | B2 | 10/2019 | You et al. |
| 10,923,925 | B2 | 2/2021 | Wurmfeld et al. |
| 11,799,321 | B1 | 10/2023 | Keppler et al. |
| 2016/0268834 | A1* | 9/2016 | Satyamoorthy ......... H02J 50/10 |
| 2017/0126278 | A1* | 5/2017 | Shao ........................ H04B 5/79 |
| 2018/0083472 | A1 | 3/2018 | Menegoli et al. |
| 2018/0083487 | A1* | 3/2018 | Nalbant ............. H02J 7/00308 |
| 2019/0181682 | A1 | 6/2019 | Kim et al. |
| 2021/0339008 | A1 | 11/2021 | Smith et al. |
| 2021/0367451 | A1 | 11/2021 | Singh et al. |

* cited by examiner

*Primary Examiner* — Alfonso Perez Borroto
(74) *Attorney, Agent, or Firm* — Quarles & Brady LLP

(57) ABSTRACT

A wireless power transfer device may include a first circuit configured to be connected in series with a coil, a second circuit, and a switch, where switching a state of the switch may selectively couple the second circuit to the first circuit. The switch may be driven by a pulse width modulation (PWM) signal. The device may further include a PWM controller to receive measurements indicative of wireless power transferred through the coil, generate the PWM signal, and adjust the PWM signal to provide the wireless power transferred through the coil according to a selected metric.

20 Claims, 10 Drawing Sheets

300

308 — IDENTIFYING A RANGE OF PARAMETERS OF THE PWM SIGNAL PROVIDING MONOTONIC CONTROL OF THE IMPEDANCE OF THE IMPEDANCE MATCHING CIRCUIT

310 — ADJUSTING THE PWM SIGNAL WITHIN THE RANGE OF PARAMETERS TO PROVIDE THE WIRELESS POWER TRANSFERRED THROUGH THE COIL ACCORDING TO A SELECTED METRIC BASED ON THE ONE OR MORE MEASUREMENTS

FIG.3B

IMPEDANCE MATCHING FOR WIRELESS POWER TRANSFER

CROSS REFERENCE TO RELATED APPLICATION

This application is a continuation of U.S. patent application Ser. No. 17/890,949, filed Aug. 18, 2022, by Marc Keppler et al. and titled, "IMPEDANCE MATCHING FOR WIRELESS POWER TRANSFER", which is hereby incorporated by reference in its entirety for all purposes.

TECHNICAL FIELD

The present disclosure is directed generally to wireless power transfer and, more particularly, to dynamic impedance matching of a coil used in wireless power transfer.

BACKGROUND

Many communication devices (e.g., smartphones, tablets, or the like) utilize wireless power transfer (WPT) to receive power for operation and/or charging an internal battery. The performance of WPT is sensitive to impedance mismatches between transmitting and receiving devices. Further, the impedance of a transmitting and/or a receiving device may change under changing conditions such as, but not limited to, load conditions associated with the receiving device. There is therefore a need to develop systems and methods to provide impedance matching in WPT.

SUMMARY

A device is disclosed in accordance with one or more illustrative embodiments of the present disclosure. In one illustrative embodiment, the device includes a first circuit that may be connected in series with a coil, where the first circuit includes at least one of one or more capacitors or one or more inductors. In another illustrative embodiment, the device includes a second circuit comprising at least one of one or more capacitors or one or more inductors. In another illustrative embodiment, the device includes a switch, where switching a state of the switch selectively connects the second circuit to the first circuit, and where the switch is configured to be driven by a pulse width modulation (PWM) signal. In another illustrative embodiment, the device includes a PWM controller to receive one or more measurements indicative of wireless power transferred through the coil, generate the PWM signal, and adjust the PWM signal to provide the wireless power transferred through the coil according to a selected metric based on the one or more measurements.

A device is disclosed in accordance with one or more illustrative embodiments of the present disclosure. In another illustrative embodiment, the device includes a pulse width modulation (PWM) controller to generate a PWM signal. In another illustrative embodiment, the device includes a first circuit that may be connected in series with a coil, where the first circuit includes at least one of one or more capacitors or one or more inductors. In another illustrative embodiment, the device includes a second circuit including at least one of one or more additional capacitors or one or more additional inductors. In another illustrative embodiment, the device includes a switch that may be driven by the PWM signal, where switching a state of the switch selectively connects the second circuit to the first circuit. In another illustrative embodiment, the device includes a PWM controller to receive one or more measurements indicative of wireless power transferred through the coil, generate the PWM signal, and adjust the PWM signal to provide the wireless power transferred through the coil according to a selected metric based on the one or more measurements.

A method is disclosed in accordance with one or more illustrative embodiments of the present disclosure. In one illustrative embodiment, the method includes generating one or more measurements indicative of wireless power transferred through a coil connected in series with a first circuit, where the first circuit comprises at least one of one or more capacitors or one or more inductors. In another illustrative embodiment, a switch selectively connects a second circuit to the first circuit, where the second circuit includes at least one of one or more additional capacitors or one or more additional inductors. In another illustrative embodiment, the method includes receiving one or more measurements indicative of wireless power transferred through the coil. In another illustrative embodiment, the method includes generating the PWM signal. In another illustrative embodiment, the method includes adjusting the PWM signal to provide the wireless power transferred through the coil according to a selected metric based on the one or more measurements.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, explain the principles of the invention.

BRIEF DESCRIPTION OF DRAWINGS

The numerous advantages of the disclosure may be better understood by those skilled in the art by reference to the accompanying figures.

FIG. 3B is a flow diagram illustrating additional steps performed in the method, in accordance with one or more embodiments of the present disclosure.

DETAILED DESCRIPTION

Figure 1A:
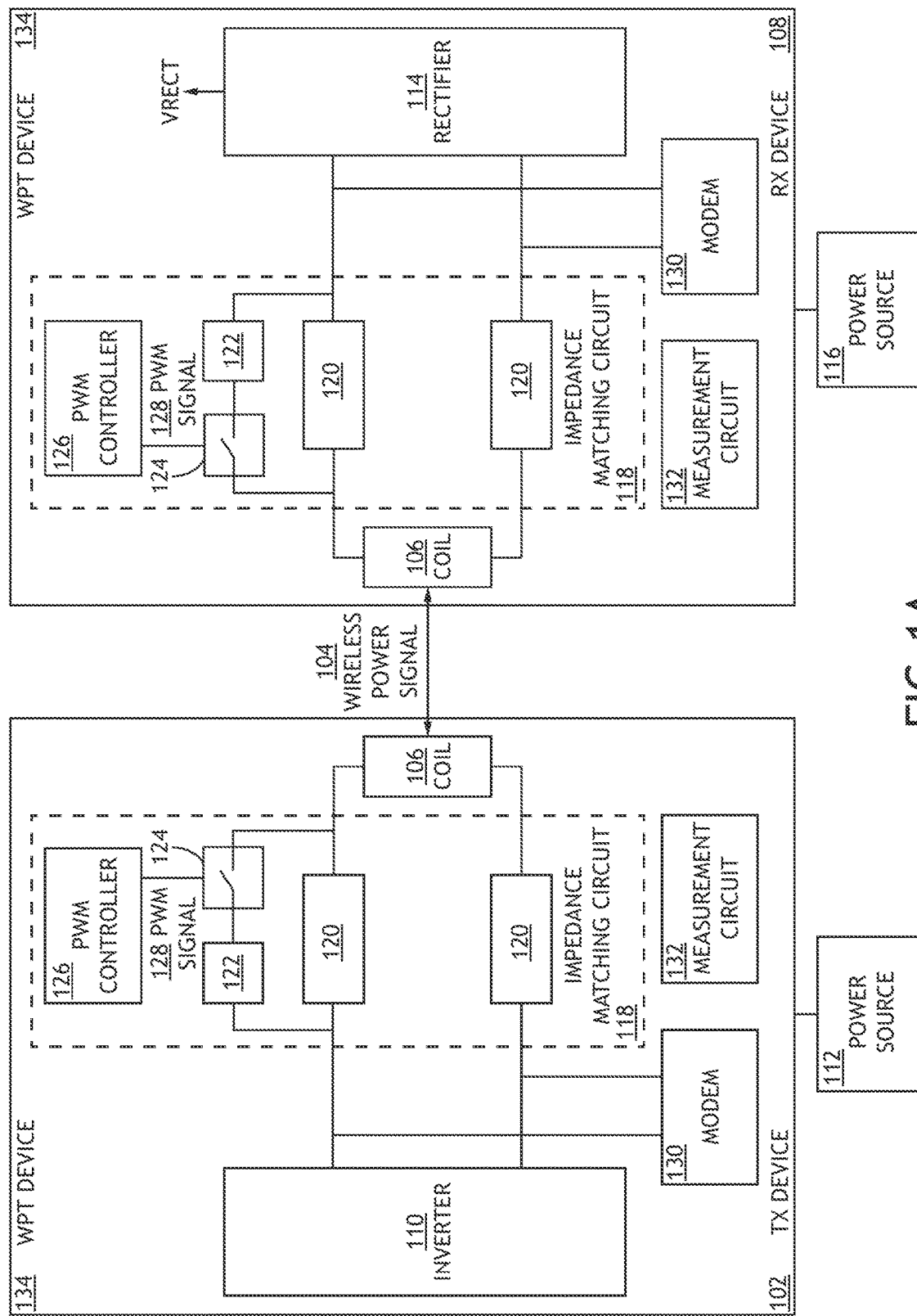
FIG. 1A is a simplified schematic of a wireless power transfer (WPT) system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

As used herein, directional terms such as "top," "bottom," "over," "under," "upper," "upward," "lower," "down," and "downward" are intended to provide relative positions for purposes of description and are not intended to designate an absolute frame of reference. Various modifications to the described embodiments will be apparent to those with skill in the art, and the general principles defined herein may be applied to other embodiments. Similarly, descriptions that a particular element is "fabricated over" another element (alternatively "located on," "disposed on," or the like) indicates a relative position of such components but does not necessarily indicate that such elements are physically in contact. Such elements may be in physical contact or may alternatively include intervening elements.

When an element (or component) is referred to herein as being "connected" (or "interconnected") or "coupled" to another element, it is to be understood that the elements can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present. Further, when a first element is referred to herein as being "configured to be connected" to a second element, it is to be understood that these elements need not be located on a common device or circuit. For example, such first and second elements may be separately packaged.

The phrase "at least one of" is used herein to refer to an open-ended listing of elements. For example, the phrase "at least one of A, B, or C" may refer to any combination of elements A, B, and/or C alone or in combination. Further, the phrase "at least one of" does not preclude additional elements. Additionally, the terms "comprising" and "including" are used interchangeably herein to refer to open-ended descriptions of components. For example, a description that a first component comprises (or includes) a second component may indicate that the first component comprises, but is not limited to, the second element. In this way, such a first element may or may not comprise additional elements.

Embodiments of the present disclosure are directed to systems and methods for impedance matching in wireless power transfer (WPT).

A WPT system may include a transmission (TX) device having a first coil (e.g., a TX coil) and a reception (RX) device having a second coil (e.g., an RX coil). Wireless power may be transferred between or through the coils using any suitable technique including, but not limited to, magnetic resonance coupling between the coils. For example, a time-varying or oscillating signal (referred to herein as a transmitted wireless power signal) may be applied to the TX coil, which may induce a corresponding time-varying or oscillating current (e.g., a received wireless power signal) in the RX coil. The wireless power signal may include any time-varying or oscillating signal suitable for providing power transfer through the coils. In some embodiments, the wireless power signal conforms to one or more standardized or selected frequency bands. In this way, the wireless power signal may have a carrier frequency (e.g., a frequency of a signal that may be modulated) and may have a limited bandwidth to conform to the selected frequency band.

It is contemplated herein that the performance of the WPT system may be highly sensitive to impedance mismatches between TX device and the RX device. In particular, an impedance mismatch may result in a reflection of a portion of power intended to be transmitted across the coils. The impedance of the TX device and/or the RX device, and thus the performance of the WPT system, may vary based on a variety of conditions including, but not limited to, a load on or in the RX device, a gap or separation between the TX or RX coil, or a carrier frequency of the wireless power signal.

As used herein, the term impedance (alternatively, electrical impedance) refers to a combined effect of resistance and reactance in a circuit in response to an alternating current (AC) waveform. Impedance may generally include both a magnitude and a phase and may thus be characterized as a complex number. A circuit (e.g., an electric circuit, an electrical circuit, or the like) may generally include any number of components through which an electrical current may flow such as, but not limited to, wires (or other conductive paths), resistors, capacitors, inductors, diodes, or active components (e.g., amplifiers, or the like). Components of a circuit may be connected in any suitable arrangement. For example, components connected in series may provide a single path for the flow of current and may further have the same current flowing through them. As another example, components connected in parallel may provide share a common input node and a common output node, where current entering the input node is split between the components. Further, a voltage drop across components connected in parallel may be equal.

Embodiments of the present disclosure are directed to a device including an impedance matching circuit (e.g., a circuit with source and load impedances designed to reduce signal reflection and/or increase power transfer) providing dynamically tunable impedance. Such an impedance matching circuit may be located on a TX device, an RX device, or a combination thereof. For example, an impedance matching circuit or components thereof may be connected to a coil or may be configured to be connected to a coil. In this way, the impedance matching circuit may be co-packaged (e.g., provided within a common housing) or may be provided as separate components that may be connected to form a circuit.

In some embodiments, an impedance matching circuit includes a first circuit including at least one or more capacitors and/or inductors (e.g., an inductor-capacitor (LC) circuit) connected or configured to be connected in series with a coil (e.g., a TX coil or an RX coil). The values of components in this first circuit may be selected to tune the impedance of the device based on expected operating conditions such as, but not limited to, expected load conditions on a receiving device, an expected gap between coils, or an expected carrier frequency of the wireless power signal. In some embodiments, the impedance matching circuit includes a second circuit including one or more additional capacitors and/or inductors (e.g., an additional LC circuit). In some embodiments, the impedance matching circuit further includes a switch (e.g., a field-effect-transistor (FET) or the like). In this way, the second circuit may be selectively connected to the first circuit based on a state of the switch (e.g., an open state or a closed state) with the effect of modifying the impedance of the impedance matching circuit. As used herein, the phrase "the second circuit may be selectively connected to the first circuit" indicates that the second circuit may be connected to or disconnected from the first circuit based on a state of the switch.

For example, the second circuit may be connected in parallel with the first circuit and the switch may be connected in series with the second circuit. In this configuration, the switch in the open state may disconnect the first and second circuits such that the impedance of the impedance matching circuit is based on the first circuit, whereas the switch in the closed state may connect the first and second circuits such that the impedance of the impedance matching circuit is based on a parallel combination of the first and second circuits. As another example, the second circuit may be connected in series with the first circuit and the switch may be connected in parallel with the second circuit. In this configuration, the switch in the closed state may disconnect the first and second circuits such that the impedance of the impedance matching circuit is based on the first circuit, whereas the switch in the open state may connect the first and second circuits such that the impedance of the impedance matching circuit is based on a series combination of the first and second circuits.

In some embodiments, the device further includes a pulse width modulation (PWM) controller connected to the switch, where the PWM controller provides a PWM signal (e.g., a signal with variable-width pulses) to control the operational state of the switch. In this way, the impedance of the device may be controlled based on various parameters of the PWM signal including, but not limited to, a switching frequency (e.g., a rate at which a state of the switch is changed), a duty cycle (e.g., the ratio of on-time to off-time), an amplitude (e.g., a maximum value of current or voltage), or a pulse shape (e.g., rectangular, sawtooth, triangular, or the like). As an illustration, the duty cycle of the PWM signal may control a relative fraction of a switching period (e.g., an inverse of the switching frequency) that the second circuit of the impedance matching circuit is connected to the first circuit. As another illustration, the amplitude and/or a pulse shape of the PWM signal may control the slew rate and maximum gate voltage applied to the switch, which may impact the current flow through the switch and thus the impedance of the impedance matching circuit.

It is contemplated herein that the performance of a WPT system may be characterized by a variety of metrics. Accordingly, some embodiments of the present disclosure are directed to systems and methods for adjusting the PWM signal to provide wireless power transfer transferred through the coil according to any selected metric or combination of metrics. For example, the selected metric may include a value of power transferred through the coil, which may be measured in Watts or any other suitable unit describing energy transferred through the coil per unit time. As an illustration, the PWM signal may be adjusted based on a peak power transferred through the coil, a power transferred through the coil according to one or more measurements, an average power transferred through a coil (e.g., over a selected timeframe), or any other statistic related to power transferred through the coil. As another example, the PWM signal may be adjusted based on an efficiency of power transfer, which may be measured as a percentage of power generated by a transmission device that is received by the receiving device or any other suitable metric. As another example, the PWM signal may be adjusted based on a value of a rectified voltage generated in an RX device by a rectifier, which may be measured in Volts or any other suitable metric.

As used herein, the term optimize is used to adjusting one or more components to provide performance according to a selected metric within a selected tolerance. Any selected metric may be used including, but not limited to, a total power transfer, an efficiency of power transfer, or a value of a rectified voltage generated in an RX device by a rectifier. As an illustration, optimizing a power efficiency of wireless power transfer may refer to providing a power efficiency above a selected value. It is thus understood that optimization as used herein relates to providing performance that is acceptable according to a suitable metric and does not necessarily require performance to match an ideal or theoretical value. Additionally, the PWM signal may be adjusted based on considerations such as, but not limited to, power consumption of the device associated with operation of the switch for impedance control, mitigating interference induced by operation of the switch for impedance control (e.g., mitigating electromagnetic interference (EMI), mitigating spurious switching of a rectifier (e.g., of an RX device) or an inverter (e.g., of a TX device), or the like). A rectifier may be any device which converts AC to DC. For example, the rectifier may be, but is not limited to, an uncontrolled rectifier or a controlled rectifier. An inverter may be any device that converts DC to AC. For example, the inverter may be, but is not limited to, a stand-alone inverter, a grid-connected inverter, or a bimodal inverter.

Some embodiments of the present disclosure are directed to a multi-band WPT device. In this way, the device may selectively transmit or receive a wireless power signal with one of multiple carrier frequencies associated with one of multiple bands. Further, such a device may include an impedance matching circuit formed as a first circuit configured to be in series with a coil for wireless power transfer, a second circuit connected in parallel with the first circuit, and a switch configured to selectively connect the second circuit to the first circuit to provide impedance control for wireless power transfer. In particular, such a device may be configured to provide an adjustable impedance through the coil to facilitate impedance matching in any selected band.

Referring now to FIGS. 1A-4C, systems and methods for impedance matching in WPT are described in greater detail, in accordance with one or more embodiments of the present disclosure.

FIG. 1A is a simplified schematic of a WPT system 100, in accordance with one or more embodiments of the present disclosure.

In some embodiments, the WPT system 100 includes a TX device 102 to generate a wireless power signal 104 and transmit the wireless power signal 104 through a coil 106 (e.g., a TX coil 106). The WPT system 100 may further include an RX device 108 to receive the wireless power signal 104 through a coil 106 (e.g., an RX coil 106). The coil 106 may include any component suitable for sending or receiving wireless power such as, but not limited to, an inductor formed as one or more turns of wire or an antenna.

In some embodiments, the TX device 102 includes one or more circuits to generate the wireless power signal 104 having a particular carrier frequency. For example, the TX device 102 illustrated in FIG. 1A includes an inverter 110 to generate a time-varying wireless power signal 104 from a direct current (DC) signal from a power source 112.

The power source 112 may include any source suitable for powering the TX device 102. In some embodiments, the power source 112 is an AC source connected to a rectifier. In some embodiments, the power source 112 is a DC source such as, but not limited to, a battery. Further, the power source 112 may be internal to the TX device 102 (e.g., in the case of a battery) or external to the TX device 102 (e.g., in the case of an AC source).

In some embodiments, the RX device 108 includes one or more circuits to convert a received time-varying wireless power signal 104 from the RX coil 106 to a DC signal, which is referred to herein as VRECT. For example, the RX device 108 may include a rectifier 114 as illustrated in FIG. 1A. The rectifier 114 may include any combination of components suitable for converting an AC voltage to a DC voltage including, but not limited to, one or more transistors or one or more diodes.

The RX device 108 may further be connected to a power source 116. The power source 116 may include any source suitable for powering the RX device 108 and any components therein. In some embodiments, the power source 116 is an AC source connected to a rectifier. In some embodiments, the power source 116 is a DC source such as, but not limited to, a battery.

As illustrated in FIG. 1A, the TX device 102 and/or the RX device 108 may include an impedance matching circuit 118 suitable for tuning an impedance of an associated coil 106.

In some embodiments, an impedance matching circuit 118 includes a first circuit 120 including one or more capacitors and/or inductors (or one or more LC circuits more generally) connected in series with a coil 106. A capacitor may be any device used to store an electric charge where one or more pairs of conductors is separated by an insulator. An inductor may be any device that stores energy in a magnetic field when an electrical current flows through it. For example, the values of the components within the first circuit 120 may be selected to tune the impedance of the coil to a selected value, which may be selected based on any considerations including, but not limited to, expected operating conditions, average operating conditions, or the like. In some embodiments, an impedance matching circuit 118 further includes a second circuit 122 including one or more capacitors and/or inductors (or one or more LC circuits more generally) connected in parallel with the first circuit 120. The impedance matching circuit 118 may then additionally include a switch 124 connected in series with the second circuit 122 and a PWM controller 126 to generate a PWM signal 128 to drive the switch 124. For example, the PWM signal 128 may be a square wave or any other waveform applied the switch 124 (e.g., to a gate terminal) that controls the state of the switch 124. In this way, the second circuit 122 may be selectively connected to the first circuit 120 to modify the impedance of the impedance matching circuit 118 and thus modify the impedance of the device (e.g., the TX device 102 or the RX device 108) as seen through the respective coil. Additional aspects of the design and/or operation of the impedance matching circuit 118 are described in greater detail with respect to FIGS. 2A-4C.

The PWM controller 126 broadly includes any device having one or more processing or logic elements (e.g., one or more micro-processor devices, one or more application specific integrated circuit (ASIC) devices, one or more field programmable gate arrays (FPGAs), or one or more digital signal processors (DSPs)). In this way, the PWM controller 126 may execute program instructions located on a memory device. The memory device may include any storage medium known in the art suitable for storing program instructions executable by the associated one or more processors. For example, the memory device may include a non-transitory memory medium. By way of another example, the memory may include, but is not limited to, a read-only memory (ROM), a random-access memory (RAM), a magnetic or optical memory device (e.g., disk), a magnetic tape, a solid-state drive, or the like.

In some embodiments, the TX device 102 and/or the RX device 108 may further establish one or more wireless communication channels for the transmission and/or reception of data in the form of communication signals. For example, the TX device 102 and/or the RX device 108 may include a modem 130 to modulate and/or demodulate communication signals. In this way, the TX device 102 and/or the RX device 108 may transmit and/or receive information such as, but not limited to, identifying information, configuration information, status indicators, or the like. In some applications, the TX device 102 and/or the RX device 108 may further transmit requests and/or control signals through the one or more communication channels to request and/or control operations from each other. A modem 130 may include any component or combination of components suitable for modulating and/or demodulating communications signal using any modulation technique including, but not limited to, amplitude shift keying (ASK) or frequency shift keying (FSK).

A communication channel may include any pathway and/or communication protocol suitable for the transmission of data. In some embodiments, at least one communication channel is formed between a TX coil 106 and an RX coil 106. For example, modems 130 in the TX device 102 and the RX device 108 may modulate the wireless power signal 104 with data that may be received and demodulated by the opposing device.

In some embodiments, the TX device 102 and/or the RX device 108 may include one or more measurement circuits 132 such as, but not limited to, a current sense circuit to measure current (e.g., electrical current) or a voltage sense circuit to measure voltage. A TX device 102 and/or the RX device 108 may generally include any number or type of measurement circuits 132 suitable for providing measurements at any location within associated circuits. For example, one or more measurement circuits 132 may be used to measure the current and/or voltage of a coil 106 of a TX device 102 and/or the RX device 108. In this way, transmitted and received wireless power associated with the wireless power signal 104 may be measured. Such measurements may be useful for, but are not limited to, determining a power transmission efficiency across the coils. As another example, one or more measurement circuits 132 may be used to measure the current and/or voltage provided by the rectifier 114 of an RX device 108. Such measurements may be useful for, but are not limited to, characterizing an efficiency of the rectifier 114.

It is contemplated herein that the TX device 102 and the RX device 108 may be formed from similar components. Accordingly, a single device may be designed to function either as a TX device 102 or as an RX device 108.

Figure 1B:
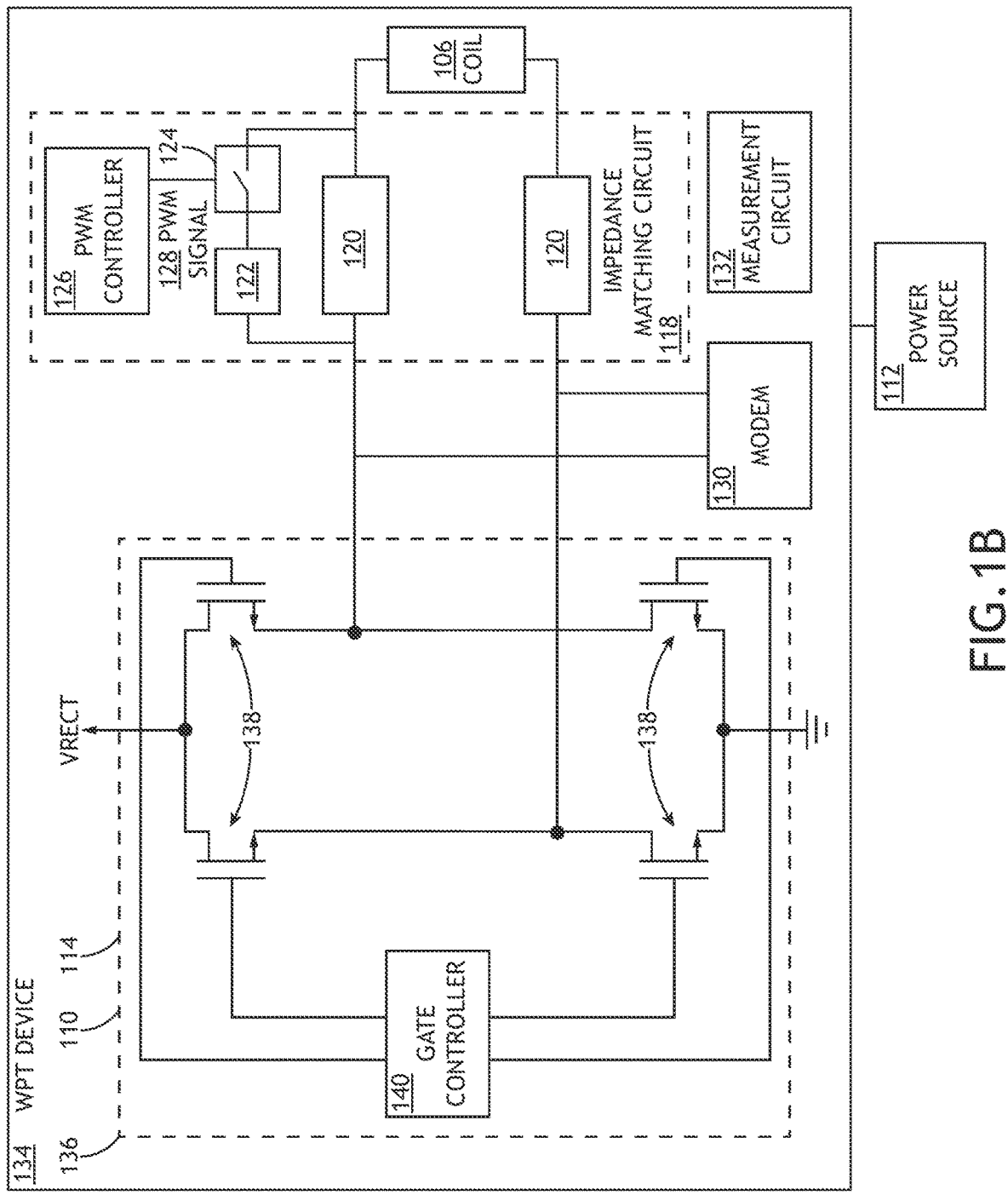
FIG. 1B is a simplified schematic of a WPT device suitable for selective operation as either a transmission (TX) device or a reception (RX) device, in accordance with one or more embodiments of the present disclosure.

As an illustration, FIG. 1B is a simplified schematic of a WPT device 134 suitable for selective operation as either a TX device 102 or an RX device 108, in accordance with one or more embodiments of the present disclosure.

In particular, the WPT device 134 includes a bridge circuit 136 configured to connect to a coil 106, which may be operable as either a TX coil 106 or an RX coil 106, where the bridge circuit 136 is suitable for operation as an inverter 110 (e.g., of a TX device 102) to generate a wireless power signal 104 for transmission through a TX coil 106 or as a rectifier 114 (e.g., of an RX device 108) to convert a wireless power signal 104 received from an RX coil 106 to a DC value (VRECT). For example, the bridge circuit 136 depicted in FIG. 1B includes four transistors 138 that may be individually driven by a gate controller 140.

The WPT device 134 may further include an impedance matching circuit 118 as disclosed herein for adjusting an impedance of the associated coil. The WPT device 134 may further include a modem 130 configurable to operate in transmit and/or receive modes (e.g., for communication across the coils 106). The WPT device 134 may further include one or more measurement circuits 132 for monitoring current and/or voltage at any suitable location.

It is further contemplated herein that any combination of the components illustrated in FIG. 1B may be directly integrated into a WPT device 134 or may be external to the WPT device 134. In some embodiments, the WPT device 134 includes one or more integrated circuit (IC) chips including at least some of the components illustrated in FIG. 1B, where at least some of the components illustrated in FIG. 1B are external to the IC chips. For example, a coil 106 may be external to the WPT device 134 such that the WPT device 134 may be configured to be connected to the coil 106. As another example, the switch 124 may be internal to the WPT device 134 (e.g., on a common IC chip as the PWM controller 126) or may be external to the WPT device 134 such that the WPT device 134 may be configured to be connected to the switch 124. In some cases, it may be desirable to provide the switch 124 external to the WPT device 134 to facilitate the current and/or voltage requirements of such a device since the instantaneous current and/or voltage of components in series with a coil in a WPT system 100 may be high.

Referring generally to FIG. 1B, it is contemplated herein that a WPT device 134 may be utilized in any device suitable for transmitting and/or receiving power via WPT techniques. For example, a WPT device 134 configured as a TX device 102 may be implemented within a wireless charging device. As another example, a WPT device 134 configured as an RX device 108 may be implemented in any device suitable for receiving power via WPT techniques including, but not limited to, mobile phones, tablets, medical implants, or toys.

Referring now to FIGS. 2A-4C, the design and control of impedance matching circuit 118 are described in greater detail, in accordance with one or more embodiments of the present disclosure.

As described previously herein, the impedance matching circuit 118 may include a first circuit 120 formed with one or more capacitors and/or inductors (e.g., an LC circuit), a second circuit 122 formed with one or more additional capacitors and/or inductors (e.g., an additional LC circuit), and a switch 124 to selectively couple the second circuit 122 with the first circuit 120.

The switch 124 may include any type or combination of components suitable for operating in at least two states with different conducting properties. For example, a switch 124 operating in an open state (e.g., a non-conducting state) may restrict or eliminate current flow between an input node and an output node, whereas a switch 124 operating in a closed state (e.g., a conducting state) may allow current flow between the input node and the output node. In some embodiments, a switch 124 includes at least one transistor such as, but not limited to, a field-effect transistor (FET), a metal-oxide-semiconductor field-effect transistor (MOSFET), a bipolar junction transistor (BJT), or a heterojunction bipolar transistor (HBT). It is contemplated herein that it may be generally desirable to reduce the power consumption of the switch 124. In some embodiments, the switch 124 is fabricated from materials and/or processes suitable for providing efficient operation such as, but not limited to gallium nitride (GaN) materials and/or processes.

The switch 124, the first circuit 120, and the second circuit 122 may be arranged in any configuration suitable for selectively engaging the second circuit 122 with the first circuit 120 depending on a state of the switch 124.

Figure 2A:
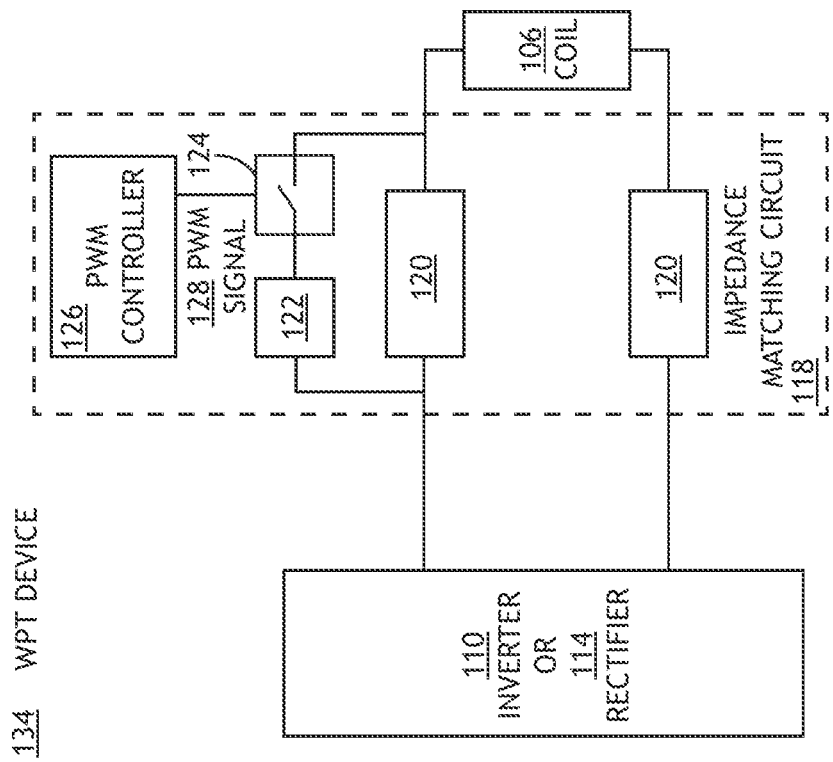
FIG. 2A is a simplified schematic view of a WPT device including a first configuration of an impedance matching circuit connected to a coil, in accordance with one or more embodiments of the present disclosure.

FIG. 2A is a simplified schematic view of a WPT device 134 including a first configuration of an impedance matching circuit 118 connected to a coil 106 (e.g., operable as a TX coil 106 or an RX coil 106), in accordance with one or more embodiments of the present disclosure. In some embodiments, as illustrated in FIG. 2A, the first circuit 120 is connected in series with the coil 106, the second circuit 122 is connected in parallel with the first circuit 120, and the switch 124 is connected in series with the second circuit 122. In this configuration, operating the switch 124 in the open state may disconnect the second circuit 122 from the first circuit 120 such that the impedance of the impedance matching circuit 118 is based solely on the first circuit 120. Operating the switch 124 in the closed state may connect the second circuit 122 to the first circuit 120 such that the impedance matching circuit 118 is based on the first circuit 120 and the second circuit 122 in combination.

Figure 2B:
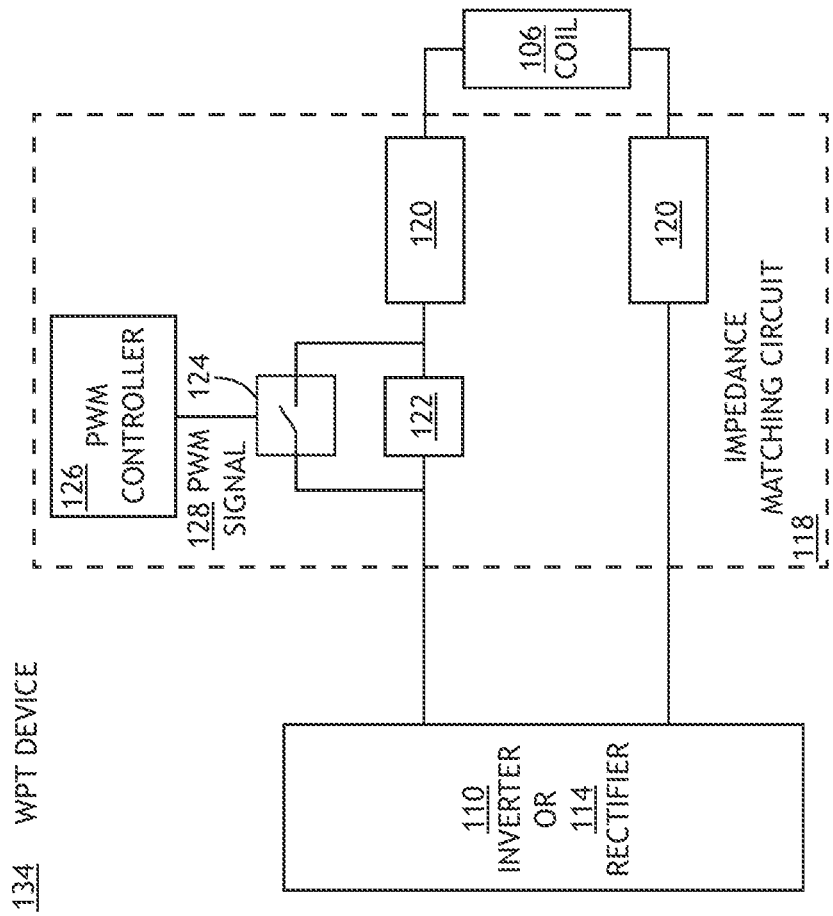
FIG. 2B is a simplified schematic view of a WPT device including a second configuration of an impedance matching circuit connected to a coil, in accordance with one or more embodiments of the present disclosure.

FIG. 2B is a simplified schematic view of a WPT device 134 including a second configuration of an impedance matching circuit 118 connected to a coil 106 (e.g., operable as a TX coil 106 or an RX coil 106), in accordance with one or more embodiments of the present disclosure. In some embodiments, as illustrated in FIG. 2B, the first circuit 120 and the second circuit 122 are connected in series with the coil 106 and each other, while the switch 124 is connected in parallel with the second circuit 122. In this configuration, operating the switch 124 in the closed state may disconnect the second circuit 122 from the first circuit 120 by effectively creating a short circuit such that the impedance of the impedance matching circuit 118 is based solely on the first circuit 120. Operating the switch 124 in the open state may connect the second circuit 122 to the first circuit 120 such that the impedance matching circuit 118 is based on the first circuit 120 and the second circuit 122 in combination.

In either configuration, the impedance of the impedance matching circuit 118 may be further tuned by driving the switch 124 with a PWM signal 128 to alternately connect the second circuit 122 to the first circuit 120 and disconnect from the second circuit 122 from the first circuit 120. In this way, the impedance of the impedance matching circuit 118 may be associated with a time-averaged value based at least in part on the duty cycle of the PWM signal 128.

Figure 2C:
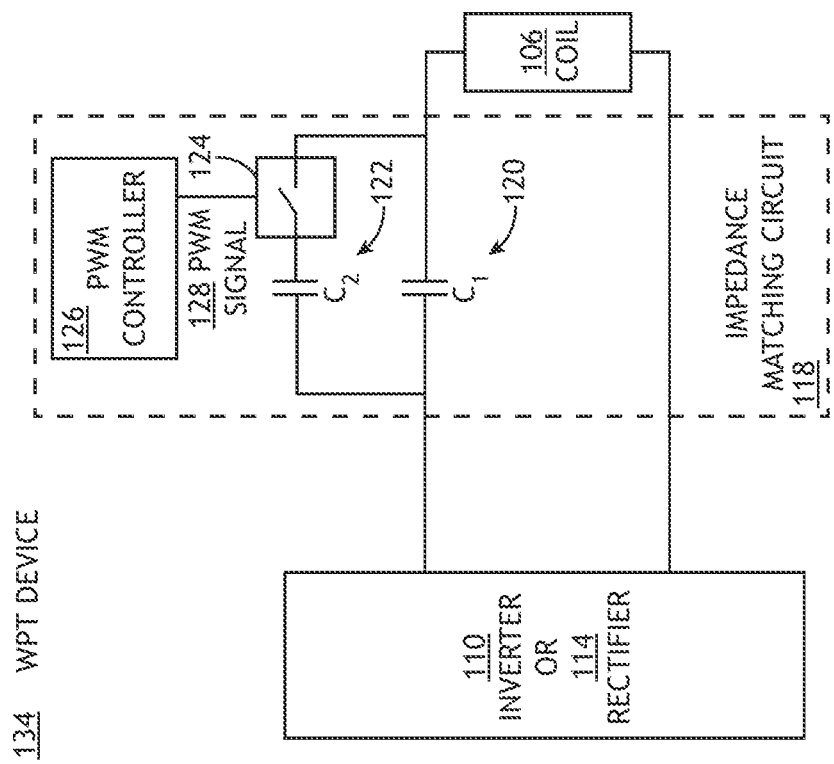
FIG. 2C is a simplified schematic view of a WPT device including an impedance matching circuit formed with capacitors, in accordance with one or more embodiments of the present disclosure.

The first circuit 120 and the second circuit 122 may each have any combination of elements suitable for adjusting an impedance of the WPT device 134 as seen through the coil 106. As an illustration, FIG. 2C is a simplified schematic view of a WPT device 134 including an impedance matching circuit 118 formed with capacitors, in accordance with one or more embodiments of the present disclosure. It is noted that the impedance (Z) of a capacitor with capacitance C may be represented as $Z=-j/\omega C$, where $\omega$ is frequency in radians. Further, capacitors in parallel may have an equivalent capacitance equal to the sum of the associated capacitors.

In FIG. 2C, the first circuit 120 includes capacitor $C_1$ and the second circuit 122 includes a capacitor $C_2$. The impedance matching circuit 118 may thus have an impedance $$Z_1 = -\frac{j}{\omega C_1}$$

when the second circuit 122 is disconnected and an impedance $$Z_2 = -\frac{j}{\omega(C_1 + C_2)}$$

when the second circuit 122 is connected.

Under at least some operating conditions, the impedance of the impedance matching circuit 118 may then be adjusted between $Z_1$ and $Z_2$ by changing parameters of the PWM signal 128 such as, but not limited to, the duty cycle. For example, the impedance matching circuit 118 may have an impedance of $Z_1$ when the duty cycle is 0 (the switch 124 being always open), an impedance of $Z_2$ when the duty cycle is 1 (the switch 124 being always closed), and varying impedance values between $Z_1$ and $Z_2$ for duty cycles between 0 and 1.

It is to be understood that FIG. 2C and the associated description is merely illustrative and should not be interpreted as limiting. Rather, the first circuit 120 and the second circuit 122 may each include any combination of capacitors and inductors such that selectively coupling the first circuit 120 and the second circuit 122 may enable switching between two impedance values based on the particular implementations of the first circuit 120 and the second circuit 122 as well as whether the switch 124 is in series with or parallel with the second circuit 122.

Additionally, it is noted that the impedance matching circuit 118 may generally include components on either side of the coil 106 as well as components in parallel with the coil 106. Further, the switch 124 and the second circuit 122 may be located on either side of the coil 106. In some embodiments, the impedance matching circuit 118 further includes multiple switches 124 and/or multiple second circuits 122 that may be selectively connected with any portions of the first circuit 120. For example, the use of multiple switches 124 and/or multiple second circuits 122 may be beneficial for, but is not limited to, multi-band operation (e.g., operation with different carrier frequencies of the wireless power signal 104). For example, different sets of switches 124 and/or multiple second circuits 122 may be used to provide dynamic impedance matching for different bands.

Figure 3A:
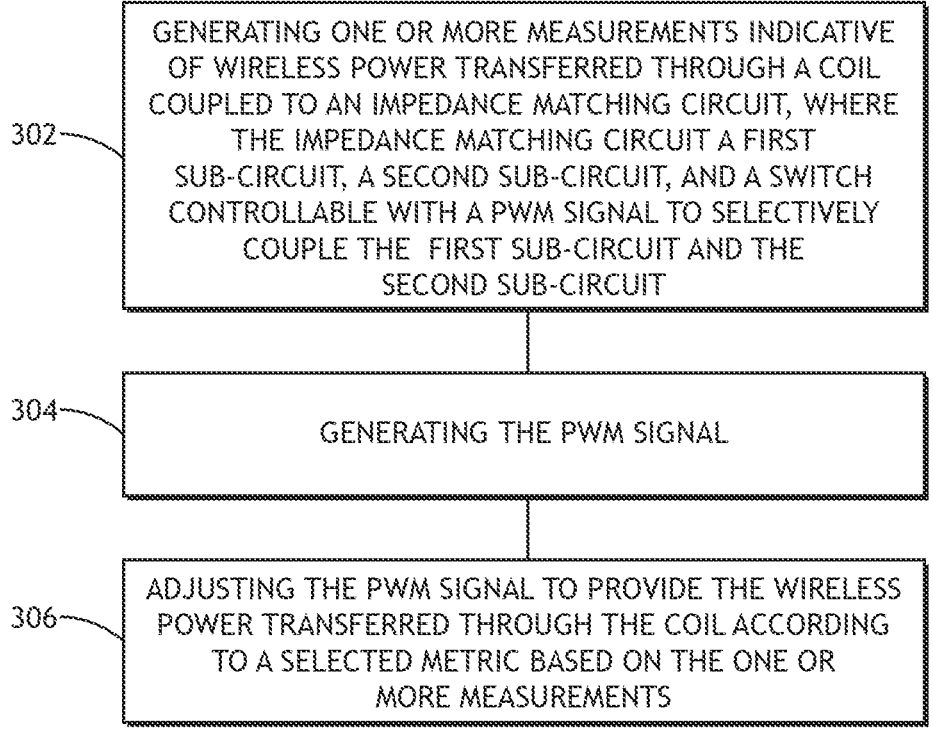
FIG. 3A is a flow diagram illustrating steps performed in a method, in accordance with one or more embodiments of the present disclosure.

Referring now to FIGS. 3A-3B, techniques for adjusting the impedance of an impedance matching circuit 118 as disclosed herein are described in greater detail in accordance with one or more embodiments of the present disclosure.

FIG. 3A is a flow diagram illustrating steps performed in a method 300, in accordance with one or more embodiments of the present disclosure. Applicant notes that the embodiments and enabling technologies described previously herein in the context of the WPT system 100 should be interpreted to extend to the method 300. It is further noted, however, that the method 300 is not limited to the architecture of the WPT system 100.

It is to be understood that the method 300 is not limited to the particular steps depicted in FIG. 3A. In some embodiments, the method 300 may include additional steps, which may be performed before the depicted steps, after the depicted steps, and/or between any of the depicted steps. In some embodiments, not all of the steps depicted in FIG. 3A are performed.

In some embodiments, the method 300 includes a step 302 of generating one or more measurements indicative of wireless power transferred through a coil 106 connected to an impedance matching circuit, where the impedance matching circuit includes a first circuit 120, a second circuit 122, and a switch 124 controllable with a PWM signal 128 to selectively connect the first circuit 120 and the second circuit 122. The one or more measurements associated with step 302 may be generated using any technique known in the art such as, but not limited to, current and/or voltage sensors. For example, the one or more measurements may include measurements of current and/or voltage in the coil 106, which may be indicative of power associated with a wireless power signal 104 (e.g., AC power) transmitted and/or received through the coil 106. As another example, the one or more measurements may include measurements of current and/or voltage measurements associated with an output of the rectifier 114 of an RX device 108 (e.g., associated with VRECT), which may be indicative of DC power provided by the RX device 108, an efficiency of the rectifier 114, and/or a power efficiency of the WPT system 100 as a whole.

In some embodiments, the method 300 includes a step 304 of generating the PWM signal 128. In some embodiments, the method 300 includes a step 306 of adjusting the PWM signal 128 to provide the wireless power transferred through the coil 106 according to a selected metric based on the one or more measurements. For example, adjusting the PWM signal 128 may include adjusting any combination of parameters of the PWM signal 128 including, but not limited to, a switching frequency, duty cycle, an amplitude, or pulse shape (e.g., rectangular, sawtooth, triangular, or the like). Further, the steps 304 and 306 may be, but are not required to be, performed by a PWM controller 126 as disclosed herein.

The step 306 may include adjusting the PWM signal 128 to provide the wireless power transferred through the coil 106 according to any selected metric. In some embodiments, the selected metric includes a total power transfer (e.g., as measured in Watts) through a coil 106. In some embodiments, the selected metric includes an efficiency of power transfer through a coil 106 (e.g., as measured as a percentage of power generated by the TX device 102 that is received by the RX device 108). In some embodiments, the selected metric includes a total power efficiency of the WPT system 100 (e.g., as measured as a percentage of power provided by the rectifier 114 (e.g., at a voltage of VRECT) relative to a total power consumed by the TX device 102 and the RX device 108 to generate that power). In some embodiments, the selected metric includes a value of a rectified voltage generated in an RX device 108 by a rectifier 114 (e.g., a value of VRECT as measured in Volts). It is contemplated herein that adjusting an impedance of an impedance matching circuit 118 in the TX device 102 and/or the RX device 108 of a WPT system 100 may be an efficient and robust technique for providing wireless power transfer according to any selected metric. As one illustration, it is recognized that a typical technique for controlling a value of a rectified voltage (VRECT) may include adjusting an amplitude of the wireless power signal 104 provided by the TX device 102. However, this technique may be relatively power inefficient due to the use of relatively large inductors and a potentially low wireless power transfer efficiency. In contrast, adjusting the impedance of the TX device 102 and/or the RX device 108 as disclosed herein may enable quick and flexible control of the rectified voltage while also ensuring efficient wireless power transfer. In some embodiments, a selected metric associated with step 306 includes a combination of several factors or sub-metrics (e.g., an unweighted combination, a weighted combination, or the like).

In some cases, it may be desirable to utilize measurements from both the TX device 102 and the RX device 108 (e.g., when the selected metric includes the total power transfer, the efficiency of power transfer through the coils 106, or the like). In these cases, one or more measurements associated with step 302 may be transmitted and/or received through a communication channel (e.g., as established by one or more modems 130), which may be, but is not required to be, associated with modulation of the wireless power signal 104. For example, one WPT device 134 (e.g., operating as a TX device 102 or an RX device 108) may send, receive, and/or request one or more measurements through such a communication channel.

It is further contemplated herein that operation of the switch 124 in the impedance matching circuit 118 utilizes power, which may negatively impact the overall power efficiency of the WPT system 100. It may therefore be desirable balance a performance increase gained through impedance matching with the power consumption of the switch 124 required to achieve this performance increase. In some embodiments, the step 306 of adjusting the adjusting the PWM signal 128 includes adjusting the PWM signal 128 to provide a power consumption of the impedance matching circuit 118 below a selected limit. This limit may generally be fixed or dynamic. For instance, if the selected metric associated with step 306 includes a total power efficiency of the WPT system 100, the power consumption of the impedance matching circuit 118 may considered and may impose a dynamic limit on the adjustments to the PWM signal 128. In some embodiments, power consumption is one of several factors considered when adjusting the PWM signal 128. For example, power consumption of the impedance matching circuit 118 may be one factor or sub-metric associated with step 306.

It is further contemplated herein that it may be desirable to limit a range of allowable values of the various parameters of the PWM signal 128 (e.g., the switching frequency, duty cycle, amplitude, and/or pulse shape) to ranges in which the impedance of the impedance matching circuit 118 may be well defined as a function of the PWM signal 128 parameters. For example, it may be desirable, but is not required, to operate the PWM controller 126 such that the impedance of the impedance matching circuit 118 monotonically change (e.g., continuously decreasing or continuously increasing) between two impedance values (e.g., $Z_1$ and $Z_2$ as described with the non-limiting example associated with FIG. 2C) in response to variations of one or more of the PWM signal 128 parameters. In this way, the PWM controller 126 (e.g., when implementing step 306 of the method 300) may dynamically adjust the impedance of the device with well-defined performance.

FIG. 3B is a flow diagram illustrating additional steps performed in the method 300, in accordance with one or more embodiments of the present disclosure. It is to be understood that the method 300 is not limited to the particular steps depicted in FIG. 3B. In some embodiments, the method 300 may include additional steps, which may be performed before the depicted steps, after the depicted steps, and/or between any of the depicted steps. In some embodiments, not all of the steps depicted in FIG. 3B are performed.

In some embodiments, the step 306 of adjusting the PWM signal 128 includes a step 308 of identifying a range of parameters of the PWM signal 128 providing monotonic control of the impedance of the impedance matching circuit 118. In some embodiments, the step 306 of adjusting the PWM signal 128 includes a step 310 of adjusting the PWM signal 128 within the range of parameters to provide the wireless power transferred through the coil 106 according to a selected metric based on the one or more measurements.

In a general sense, any combination of parameters of the PWM signal 128 may be simultaneously controlled. However, it may be desirable to control (e.g., adjust) a single parameter of the PWM signal 128 such as the duty cycle, while maintaining other parameters at fixed values.

For example, the step 308 may include identifying values of at least one of a switching frequency, an amplitude, or a pulse shape of the PWM signal 128 such that variations of the duty cycle provide monotonic control of the impedance of the impedance matching circuit 118.

The operational ranges of the PWM signal 128 parameters suitable for providing monotonic control of the impedance may be static or may vary based on operating conditions.

The coil 106 in a WPT device 134 may operate in various modes including, but not limited to, a continuous conduction mode (CCM) or a discontinuous conduction mode (DCM). Further, the impact of selectively coupling the second circuit 122 with the first circuit 120 of the impedance matching circuit 118 may vary based on the operational mode. Additionally, the impact of selectively coupling the second circuit 122 with the first circuit 120 of the impedance matching circuit 118 may vary based on a relationship between the carrier frequency of the wireless power signal 104 and a switching frequency of the PWM signal 128. For instance, increased temporal complexity of the wireless power signal 104 which may be associated with, but is not limited to, DCM modes, may require an increased switching frequency of the PWM signal 128 to provide a well-defined or monotonic relationship between the duty cycle of the PWM signal 128 and the impedance of the impedance matching circuit 118.

For example, in the CCM mode, the duty cycle may provide monotonic control over the impedance of the impedance matching circuit 118 for a wide range of switching frequencies. In some cases, the switching frequency of the PWM signal 128 may be equal to or lower than the carrier frequency of the wireless power signal 104. In this way, relatively low switching frequencies may be utilized to reduce the power consumption of the impedance matching circuit 118.

As another example, in the DCM mode, the switching frequency of the PWM signal 128 may need to be increased relative to the CCM mode to provide a well-defined or monotonic relationship between the duty cycle of the PWM signal 128 and the impedance of the impedance matching circuit 118. In some cases, the switching frequency of the PWM signal 128 may need to be equal to or higher than the carrier frequency of the wireless power signal 104.

Figure 4A:
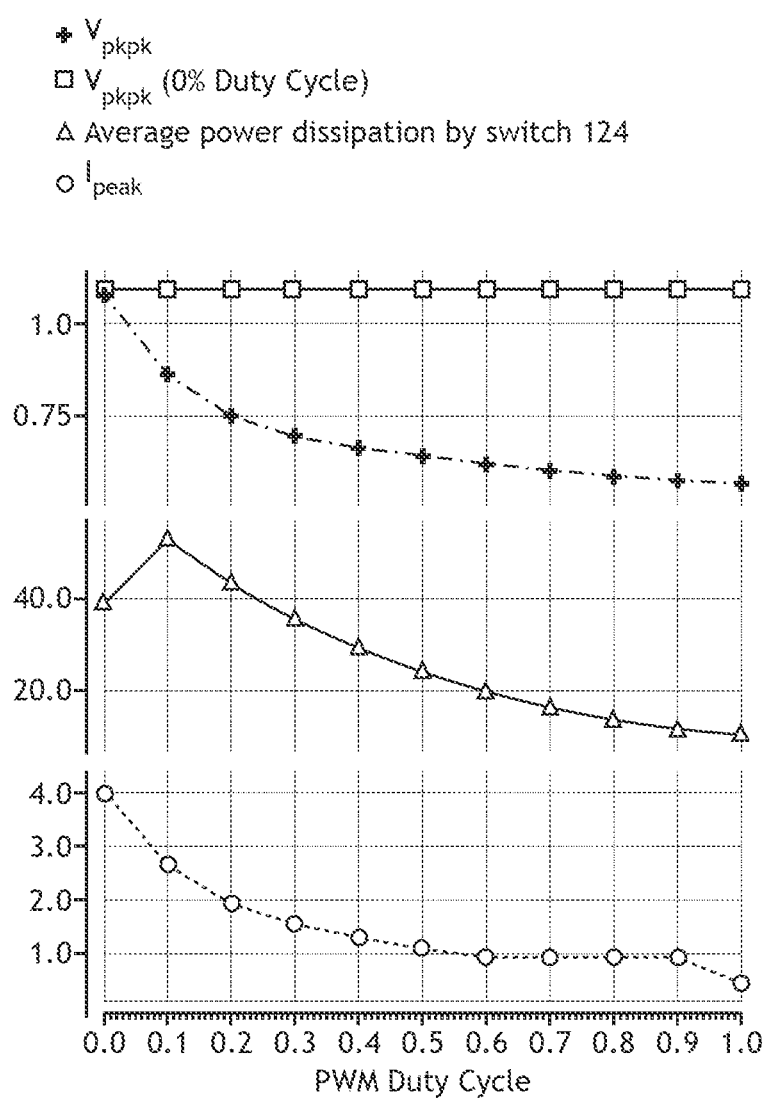
FIG. 4A includes plots of peak-to-peak voltage, average power dissipation, and peak load current of 500 mA, in accordance with one or more embodiments of the present disclosure.
Figure 4B:
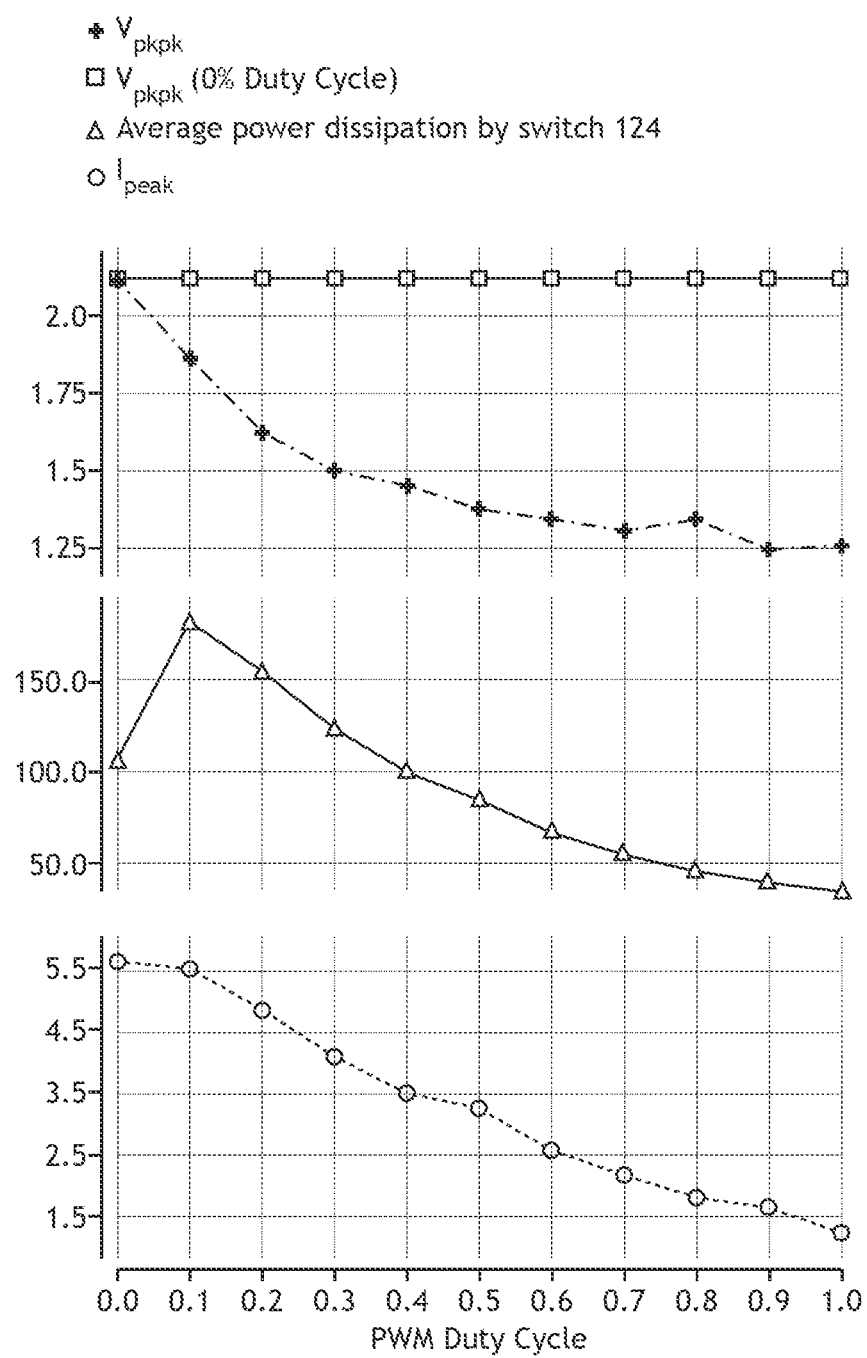
FIG. 4B includes plots of peak-to-peak voltage, average power dissipation, and peak load current of 1 A, in accordance with one or more embodiments of the present disclosure.
Figure 4C:
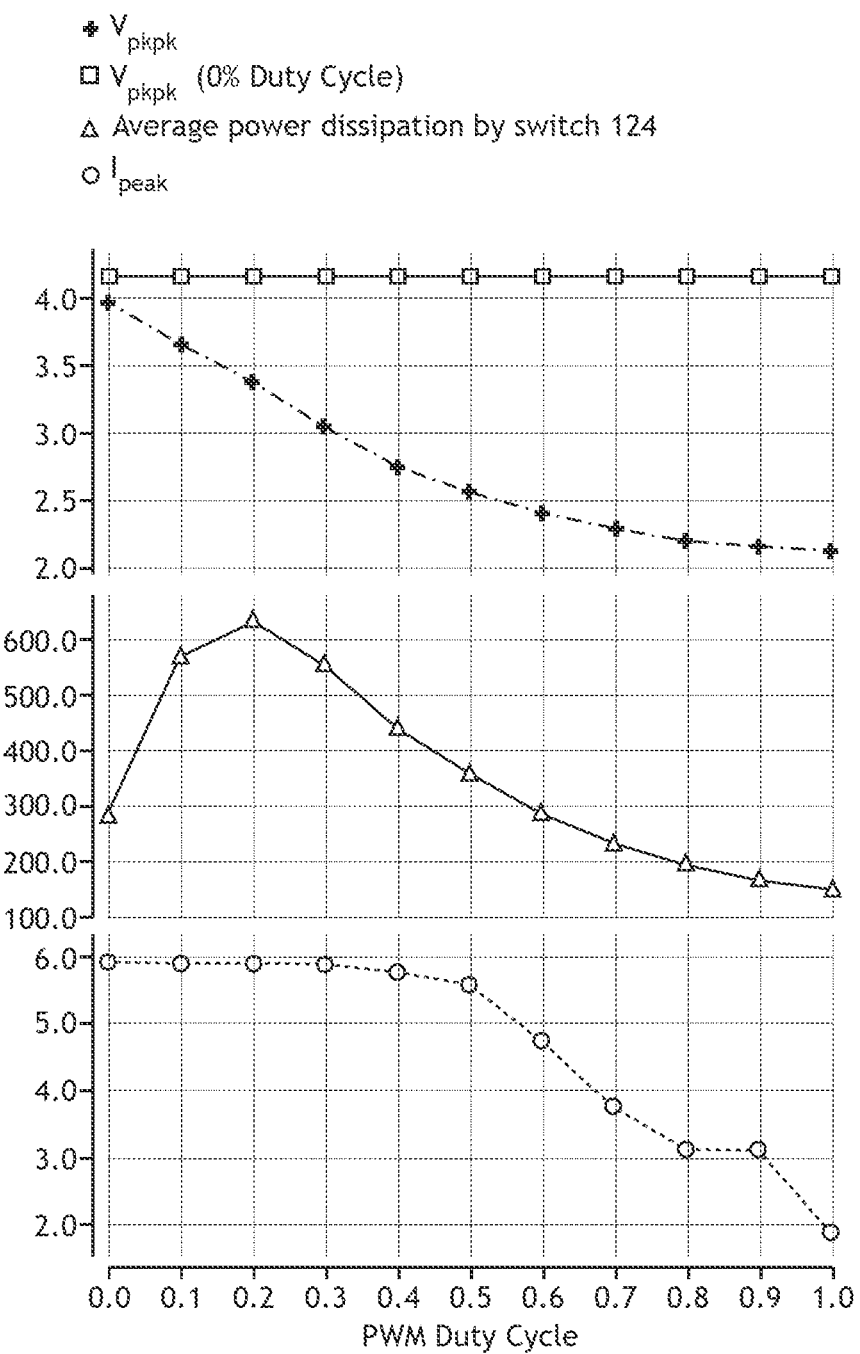
FIG. 4C includes plots of peak-to-peak voltage, average power dissipation, and peak load current of 2 A, in accordance with one or more embodiments of the present disclosure.

FIGS. 4A-4C depict simulations of the current, voltage, and power characteristics across a capacitor in an impedance matching circuit 118 for different coil currents, where the impedance matching circuit 118 corresponds to the illustration in FIG. 2C and the plots depict characteristics of capacitor $C_1$ corresponding to the first circuit 120. FIG. 4A includes plots of peak-to-peak voltage across capacitor $C_1$, average power dissipation by the switch 124, and peak load current ($I_{LOAD}$) of 500 mA, in accordance with one or more embodiments of the present disclosure. FIG. 4B includes plots of peak-to-peak voltage across capacitor $C_1$, average power dissipation by the switch 124, and peak load current ($I_{LOAD}$) of 1 A, in accordance with one or more embodiments of the present disclosure. FIG. 4C includes plots of peak-to-peak voltage across capacitor $C_1$, average power dissipation by the switch 124, and peak load current ($I_{LOAD}$) of 2 A, in accordance with one or more embodiments of the present disclosure. In FIGS. 4A-4C, the switching frequency of the PWM signal 128 was selected to be eight times the carrier frequency of 360 kHz.

As illustrated in FIGS. 4A-4C, varying the duty cycle under the simulated conditions provided monotonic changes in the peak-to-peak voltage and the peak current across the capacitive first circuit 120 for a wide range of operating coil currents. However, it is noted that the particular peak-to-peak voltage, power dissipation, and the peak current values as a function of duty cycle changed as a function of coil current, which indicates increasing complexity of the wireless power signal 104 with increasing power. FIGS. 4A-4C also illustrate that significant power can be dissipated in the switch 124. If overall system power dissipation is to be minimized, the PWM duty cycle, PWM switching frequency, and/or PWM amplitude may be selected and/or optimized using the measurement-based metrics described herein.

In some embodiments, the step 306 includes adjusting the PWM signal 128 to mitigate noise and/or interference (e.g., EMI) that may impact other components in the WPT device 134 or external to the WPT system 100. For example, a switching frequency of the PWM signal 128 may be selected to avoid a frequency associated with a communication channel between a TX device 102 and an RX device 108 or harmonics thereof. As another example, the switching frequency and/or the phase of the PWM signal 128 may be adjusted to correspond to the carrier frequency of the wireless power signal 104 or a harmonic thereof in order to mitigate or eliminate an impact of the switch 124 on an operation of a rectifier 114 and/or inverter 110.

In some embodiments, the PWM controller 126 is connected to the rectifier 114 and/or inverter 110. In this way, the rectifier 114 and/or inverter 110 may be controlled (e.g., by the gate controller 140) to mitigate noise or interference associated with operation of the switch 124 for impedance control. For example, the rectifier 114 and/or inverter 110 may disallow switching internal transistors 138 within a selected timeframe after a transition of the PWM signal (e.g., a switch from a high signal to a low signal, or vice versa). Such a technique may be characterized as digital blanking. As another example, debounce times associated with switching the internal transistors 138 may be tailored based on transitions of the PWM signal 128 to filter noise generated by the transitions.

It is contemplated herein that the step 306 of adjusting the PWM signal 128 may be carried out any number of times and at any regular or irregular intervals. In some embodiments, the step 306 is carried out during an initialization step (e.g., when TX device 102 and/or the RX device 108 are powered on, when the TX device 102 and the RX device 108 are brought into close enough proximity to initiate wireless power transfer, or any other initialization condition that triggers an initialization step). In some embodiments, the step 306 is carried out at periodic intervals to ensure operation according to the selected metric. In some embodiments, the step 306 is carried out in response to one or more trigger conditions. For example, the step 306 may be carried out when the selected metric is not met based on measurements associated with step 302.

Referring again to FIG. 3B, the step 308 of identifying a range of parameters of the PWM signal 128 providing monotonic control of the impedance of the impedance matching circuit 118 may be carried out at any time such as, but not limited to, an initialization step, at periodic intervals, or in response to trigger conditions as described above. In some embodiments, the step 308 is carried out less frequently than the step 310. For example, the step 310 may include adjusting the PWM signal 128 within the range of parameters identified in 308 for an extended period of time and performing the step 308 when necessary (e.g., in response to a trigger condition).

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A device, comprising:
   a coil configured to receive a first signal, the coil being characterized by a first impedance;
   a circuit connected to the coil, the circuit being configured to adjust the first signal by adjusting the first impedance, the circuit comprising:
   a first circuit connected to the coil;
   a second circuit connected to the first circuit; and
   a switch connected to the second circuit, the switch being configured to be driven by a pulse width modulation (PWM) signal; and
   a PWM controller connected to the switch, the PWM controller being configured to generate the PWM signal;
   wherein the circuit is configured to adjust the first impedance by driving the switch using the PWM signal.

2. The device of claim 1, wherein the PWM controller is further configured to:
   receive a measurement indicative of a wireless power transferred through the coil; and
   adjust the PWM signal to provide the wireless power transferred through the coil according to a selected metric based on the measurement.

3. The device of claim 1, further comprising a rectifier connected in parallel with the circuit, the rectifier being configured to generate a rectified voltage associated with the first signal.

4. The device of claim 1, wherein:
   the second circuit is configured in parallel relative to the first circuit; and
   the switch is connected in series with the second circuit.

5. The device of claim 1, wherein:
   the second circuit is configured in series relative to the first circuit; and
   the switch is connected in parallel with the second circuit.

6. The device of claim 1, wherein the PWM controller is further configured to adjust the PWM signal to provide a power consumption of the switch equal to or below a power consumption limit.

7. The device of claim 1, wherein the PWM controller is further configured to adjust the PWM signal to produce noise in a communication channel through the coil lower than a selected tolerance.

8. The device of claim 1, wherein the device is a transmission device configured to transmit a wireless power.

9. The device of claim 1, wherein the device is a reception device configured to receive a wireless power.

10. A device, comprising:
a coil configured to receive a first signal, the coil being characterized by a first impedance;
a circuit connected to the coil, the circuit being configured to adjust the first signal by adjusting the first impedance, the circuit comprising:
a first circuit connected in series with the coil;
a second circuit connected to the first circuit; and
a switch connected to the second circuit, the switch being configured to be driven by a pulse width modulation (PWM) signal; and
a PWM controller connected to the switch, the PWM controller being configured to generate the PWM signal;
wherein the circuit is configured to adjust the first impedance by driving the switch using the PWM signal to selectively connect the second circuit to the first circuit.

11. The device of claim 10, further comprising a rectifier connected in parallel with the circuit, the rectifier being configured to generate a rectified voltage associated with the first signal.

12. The device of claim 11, wherein the PWM controller is further configured to:
receive a measurement indicative of a wireless power transferred through the coil; and
adjust the PWM signal to provide the wireless power transferred through the coil according to a selected metric based on the measurement.

13. The device of claim 12, wherein the selected metric comprises a value of the rectified voltage.

14. The device of claim 10, wherein the device is a transmission device configured to transmit a wireless power.

15. The device of claim 10, wherein the device is a reception device configured to receive a wireless power.

16. A device, comprising:
a coil configured to receive a first signal, the coil being characterized by a first impedance;
a circuit connected to the coil, the circuit being configured to adjust the first signal by adjusting the first impedance, the circuit comprising:
a first circuit connected to the coil;
a second circuit connected to the first circuit; and
a switch connected to the second circuit, the switch being configured to be driven by a pulse width modulation (PWM) signal; and
a PWM controller connected to the switch, the PWM controller being configured to:
receive a measurement indicative of a wireless power transferred through the coil;
generate the PWM signal; and
adjust the PWM signal to provide the wireless power transferred through the coil according to a selected metric based on the measurement;
wherein the circuit is configured to adjust the first impedance by driving the switch using the PWM signal.

17. The device of claim 16, wherein the selected metric comprises an efficiency of the wireless power transferred through the coil.

18. The device of claim 16, wherein the selected metric comprises a value of the wireless power transferred through the coil.

19. The device of claim 16, wherein the PWM controller is further configured to adjust the PWM signal to provide a power consumption of the switch equal to or below a power consumption limit.

20. The device of claim 16, further comprising a rectifier connected in parallel with the circuit, the rectifier being configured to generate a rectified voltage associated with the first signal.

* * * * *